(12) United States Patent
Pedersen et al.

(10) Patent No.: US 9,357,539 B2
(45) Date of Patent: *May 31, 2016

(54) APPARATUS, METHOD, AND COMPUTER PROGRAM PRODUCT PROVIDING PERSISTENT UPLINK AND DOWNLINK RESOURCE ALLOCATION

(71) Applicant: Nokia Corporation, Espoo (FI)

(72) Inventors: Klaus I. Pedersen, Aalborg (DK); Preben E. Mogensen, Gistrup (DK); Claudio Rosa, Randers NV (DK)

(73) Assignee: Nokia Technologies Oy, Espoo (FI)

( * ) Notice: Subject to any disclaimer, the term of this patent is extended or adjusted under 35 U.S.C. 154(b) by 243 days.

This patent is subject to a terminal disclaimer.

(21) Appl. No.: 13/866,316

(22) Filed: Apr. 19, 2013

(65) Prior Publication Data

US 2014/0314051 A1    Oct. 23, 2014

Related U.S. Application Data

(63) Continuation of application No. 11/700,999, filed on Feb. 1, 2007, now Pat. No. 8,452,295.

(60) Provisional application No. 60/765,081, filed on Feb. 3, 2006.

(51) Int. Cl.
*H04J 3/00* (2006.01)
*H04W 72/04* (2009.01)
*H04L 5/00* (2006.01)

(52) U.S. Cl.
CPC ........... *H04W 72/042* (2013.01); *H04L 5/0094* (2013.01); *H04L 5/0007* (2013.01); *H04L 5/0044* (2013.01)

(58) Field of Classification Search
None
See application file for complete search history.

(56) References Cited

U.S. PATENT DOCUMENTS

| | | | | |
|---|---|---|---|---|
| 6,714,515 | B1 | 3/2004 | Marchand | 370/231 |
| 7,558,294 | B2 | 7/2009 | Yonge et al. | |
| 2002/0071407 | A1* | 6/2002 | Koo et al. | 370/335 |
| 2002/0181436 | A1 | 12/2002 | Mueckenheim et al. | 370/349 |
| 2004/0105402 | A1 | 6/2004 | Yi et al. | 370/312 |
| 2004/0125779 | A1* | 7/2004 | Kelton | H04W 72/12 370/338 |
| 2004/0185860 | A1* | 9/2004 | Marjelund | H04L 12/5695 455/450 |
| 2005/0117536 | A1 | 6/2005 | Cho et al. | 370/328 |
| 2005/0186933 | A1 | 8/2005 | Trans | 455/296 |
| 2005/0249133 | A1* | 11/2005 | Terry | H04L 1/0025 370/278 |
| 2005/0276256 | A1 | 12/2005 | Raitola et al. | 370/349 |
| 2006/0203724 | A1 | 9/2006 | Ghosh et al. | 370/229 |
| 2006/0221933 | A1 | 10/2006 | Bauer et al. | 370/352 |
| 2006/0223585 | A1 | 10/2006 | Legg | 455/560 |
| 2006/0234716 | A1 | 10/2006 | Vesterinen et al. | 455/450 |

(Continued)

OTHER PUBLICATIONS

Ericsson, "Persistent Scheduling for E-UTRA," TSG RAN WG1 LTE AdHoc, R1-060099, Helsinki, Finland, Jan. 23-25, 2006.

(Continued)

*Primary Examiner* — Edan Orgad
*Assistant Examiner* — Rebecca Song
(74) *Attorney, Agent, or Firm* — Harrington & Smith (57) ABSTRACT

Apparatus, methods, computer program products, systems and circuits are provided that allow for persistent uplink and downlink resource allocations. A method includes: allocating resources to a user equipment for a data flow over a plurality of time intervals with a single signaling event at a wireless network radio network layer; and informing the user equipment of the allocated resources.

25 Claims, 4 Drawing Sheets

(56) References Cited

U.S. PATENT DOCUMENTS

| | | | |
|---|---|---|---|
| 2006/0291393 A1 | 12/2006 | Teague et al. | 370/235 |
| 2007/0025383 A1 | 2/2007 | Katar et al. | 370/442 |
| 2007/0025398 A1 | 2/2007 | Yonge et al. | 370/508 |
| 2007/0058595 A1 | 3/2007 | Classon et al. | 370/337 |
| 2007/0064669 A1 | 3/2007 | Classon et al. | 370/347 |
| 2007/0111757 A1 | 5/2007 | Cao et al. | 455/561 |
| 2007/0133458 A1 | 6/2007 | Chandra et al. | 370/329 |
| 2007/0223367 A1* | 9/2007 | Wu et al. | 370/216 |
| 2007/0298822 A1 | 12/2007 | Wan et al. | 455/509 |
| 2008/0080474 A1 | 4/2008 | Kitchin | 370/349 |
| 2009/0022098 A1 | 1/2009 | Novak et al. | 370/329 |
| 2009/0135807 A1 | 5/2009 | Shrivastava et al. | 370/352 |
| 2009/0232059 A1 | 9/2009 | Sundberg et al. | 370/329 |

OTHER PUBLICATIONS

NTT DoCoMo, Inc. Uplink resource allocation scheme (persistent scheduling), TSG RAN WG2, R2-062913, Seoul, Korea, Oct. 9-13, 2005.

QUALCOMM Europe, "Considerations for Control Signalling Support of Real Time Services", 3GPP TSG-RAN WG1 LTD Ad Hoc, R1-060173, $3^{rd}$ Generation Partnership Project, Jan. 25, 2006.

* cited by examiner

APPARATUS, METHOD, AND COMPUTER PROGRAM PRODUCT PROVIDING PERSISTENT UPLINK AND DOWNLINK RESOURCE ALLOCATION

CROSS-REFERENCE TO RELATED APPLICATIONS

This patent application is a continuing application of U.S. application Ser. No. 11/700,999, filed Feb. 1, 2007, which claims priority under 35 U.S.C. §119(e) from Provisional Patent Application No.: 60/765,081, filed Feb. 3, 2006, the disclosures of which are incorporated by reference herein in their entirety.

TECHNICAL FIELD

The exemplary embodiments of this invention relate generally to wireless communications systems and devices and, more specifically, relate to packet mode transmissions of data between a wireless network and a user equipment (UE), such as a cellular phone.

BACKGROUND

The following abbreviations are herewith defined.
BTS base station
DL downlink (Node B to UE)
FDMA frequency division multiple access
IP internet protocol
L1 layer 1 (physical layer, PHY)
L2 layer 2 (medium access control, MAC)
L3 layer 3 (radio network layer, RNL)
LTE long term evolution of UTRAN
MAC medium access control (layer 2, L2)
Node B base station
OFDMA orthogonal frequency division multiple access
PDCP packet data convergence protocol
PHY physical layer (layer 1, L1)
QoS quality of service
RNL radio network layer (layer 3, L3)
RRC radio resource control
SAP service access point
SFN system frame number
TTI transmission time interval
UE user equipment
UL uplink (UE to Node B)
UTRAN universal terrestrial radio access network
VoIP voice over IP A reasonable working assumption when considering UTRAN LTE, which may sometimes be referred to as 3.9G, is that the system will primarily rely on so-called one time allocations, where a serving cell explicitly signals to a UE in every sub-frame where the UE is allocated transmission resources. The signaling to allocate transmission resources can be sent as part of a Layer-1 (physical layer) allocation table. However, the allocation table represents a signaling overhead that consumes some amount of the finite available bandwidth.

SUMMARY

In an exemplary aspect of the invention, a method includes: allocating resources to a user equipment for a data flow over a plurality of time intervals with a single signaling event at a wireless network radio network layer; and informing the user equipment of the allocated resources.

In another exemplary aspect of the invention, a computer program product is provided. The computer program product has program instructions embodied on a tangible computer-readable medium. Execution of the program instructions results in the following operations: allocating resources to a user equipment for a data flow over a plurality of time intervals with a single signaling event at a wireless network radio network layer; and informing the user equipment of the allocated resources.

In a further exemplary aspect of the invention, a device includes: a radio network layer component configured to allocate resources to a user equipment for a plurality of time intervals with a single signaling event; and a transmitter coupled to the radio network layer component, wherein the transmitter is configured to transmit information indicative of the allocated resources to the user equipment.

In another exemplary aspect of the invention, a system includes a user equipment and a base station. The base station is configured to: allocate resources to the user equipment for a plurality of time intervals with a single signaling event at a wireless network radio network layer; and inform the user equipment of the allocated resources.

In a further exemplary aspect of the invention, a circuit includes a manager function configured to allocate resources to a user equipment for a plurality of time intervals with a single signaling event at a wireless network radio network layer.

In another exemplary aspect of the invention, a wireless network component includes: a radio network layer comprising means for allocating persistent resources to a user equipment for a data flow; and a communication means between the radio network layer and a physical layer for informing the physical layer of the allocated persistent resources.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In an aspect thereof, the exemplary embodiments of this invention reduce the signaling overhead by pre-allocating a pattern of transmission resources to a particular UE. This procedure may be referred to, in a non-limiting sense, as a persistent allocation or as a semi-static allocation, and implies an allocation of resources for more than one transmission interval (e.g., more than one sub-frame). The exemplary embodiments of this invention pertain to both the physical layer aspects and to Layer-3 signaling mechanisms to support persistent allocation. The use of the exemplary embodiments of this invention is applicable for both the uplink (UE to wireless network) and downlink (wireless network to UE).

The use of the exemplary embodiments of this invention is particularly well-suited to, and provides enhanced operation for, UTRAN LTE. The UTRAN LTE relies on OFDMA in the DL and single carrier FDMA in the UL, where a default conventional assumption for both the DL and the UL is the use of fast scheduling/user multiplexing every 1.0 msec TTI (i.e., one time allocations). However, it should be appreciated that at least certain aspects of this invention have wider applicability, and may be employed in other types of networks and systems.

Figure 1:
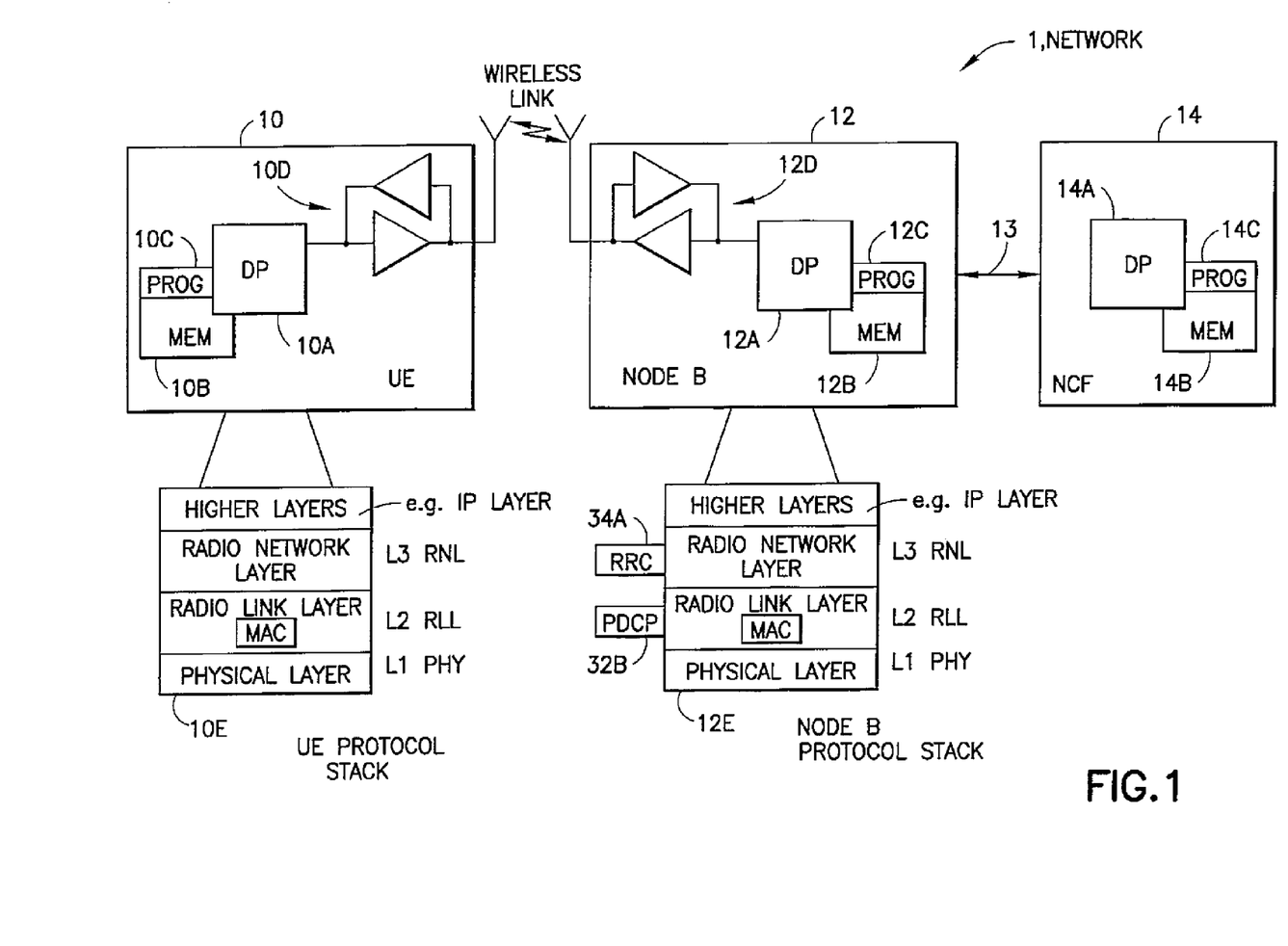
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 1 is adapted for communication with a UE 10 via a Node B (base station) 12. The network 1 may include at least one network control function (NCF) 14. The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The Node B 12 is coupled via a data path 13 to the NCF 14 that also includes a DP 14A and a MEM 14B storing an associated PROG 14C. At least one of the PROGs 10C, 12C and 14C is assumed to include program instructions that, when executed by the associated DP, enable the electronic device to operate in accordance with the exemplary embodiments of this invention, as will be discussed below in greater detail.

The UE 10 is assumed to include and implement a protocol stack 10E containing at least layers L1 (PHY), L2 (RLL) and L3 (RNL), and typically higher layers as well (e.g., an IP layer). As is shown more particularly in FIG. 4, the Node B 12 is assumed to include and implement a protocol stack 12E also containing at least layers L1 (PHY), L2 (RLL) and L3 (RNL), and typically also the higher layers as well (e.g., an IP layer). The L2 (MAC layer) of the Node B 12 includes the functionality of a PDCP 32B, and the L3 (RNL) includes the functionality of a RRC 34A, as discussed in further detail below.

In general, the various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by the DP 10A of the UE 10 and the DP 12A of the Node B, or by hardware, or by a combination of software and hardware.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Figure 2:
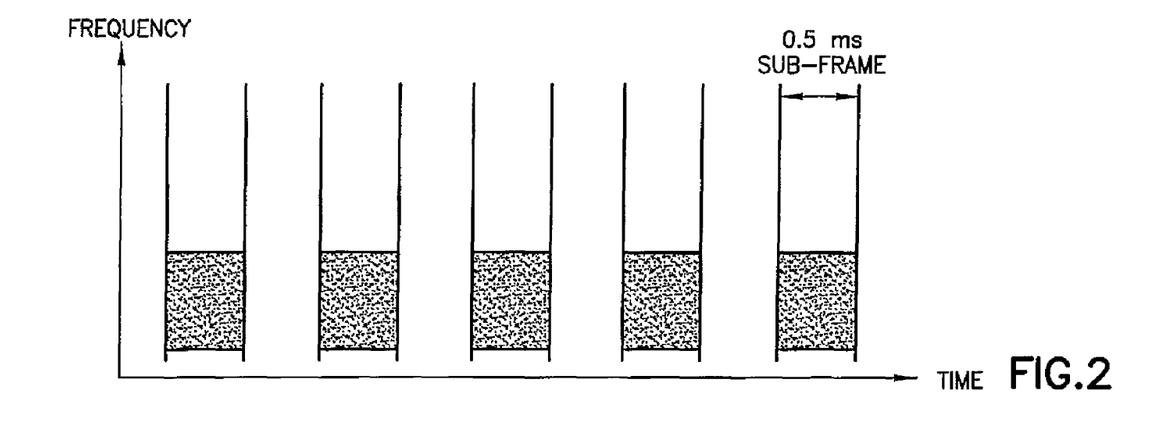
FIG. 2 shows, in accordance with the exemplary embodiments of this invention, an example of periodic allocation of transmission resources to one user from persistent resource allocation function that is resident in a Node B Radio Network Layer.
Figure 3:
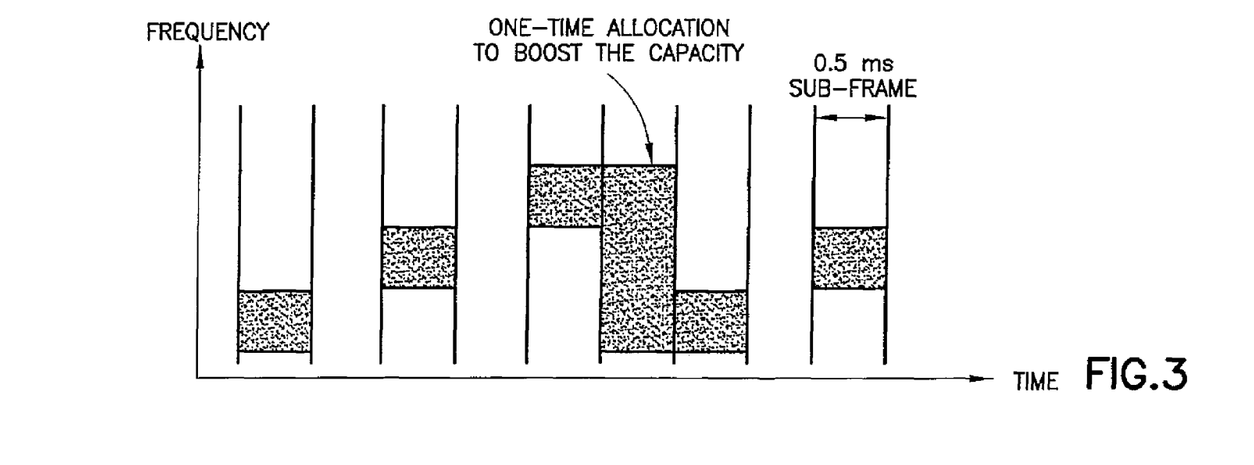
FIG. 3 shows, in accordance with the exemplary embodiments of this invention, an example of a hybrid approach where both persistent allocations and one-time (temporary) allocations are applied.

In accordance with the exemplary embodiments of this invention, a network element, such as the Node B 12, pre-allocates transmission resources to at least one UE 10, and thus avoids sending a Layer-1 allocation table for every allocation per sub-frame. FIG. 2 shows a non-limiting example where transmission resources are periodically allocated to a UE 10 in the frequency-time domain. This example assumes localized transmission in the frequency domain in the allocated sub-frames, but it should be realized that the process can be generalized to cover cases with distributed transmission in the frequency domain per sub-frame. The example in FIG. 2 illustrates a case where only persistent allocation is used for the UE 10. However, as illustrated in FIG. 3, a hybrid approach can also be adapted where both persistent allocation and one-time allocation is used. This permits temporarily increasing the capacity allocation to a UE 10 if the granted persistent allocation is found to be insufficient for some relatively short (temporary) period of time.

Note that in the example of FIG. 2, the UE 10 is assigned the same band of frequencies in each consecutive sub-frame, whereas in the example of FIG. 3, the UE 10 is assigned different frequency bands per sub-frame.

Note should also be made of the fact that the exemplary persistent allocation schemes shown in FIGS. 2 and 3 are both applicable for the UL and/or the DL.

The use of persistent allocations in accordance with the exemplary embodiments of this invention is particularly well suited for, but not restricted to, those services that require constant or approximately constant bit rates, such as VoIP and streaming, as two non-limiting examples, where it is known in advance how many transmission resources are needed by the UE 10.

Figure 4:
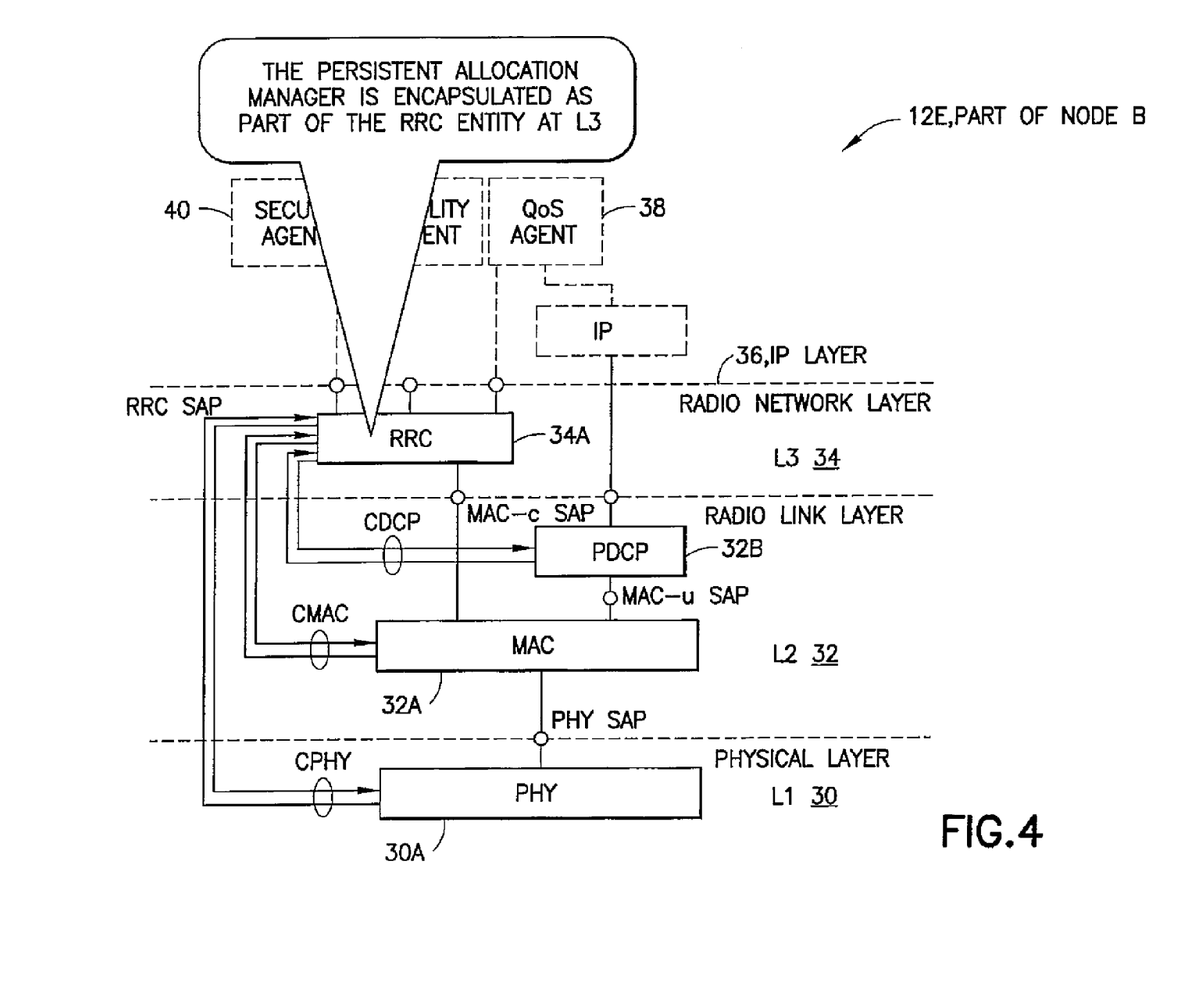
FIG. 4 is a block diagram of a Node B protocol stack that illustrates the Radio Network Layer that controls making persistent resource allocations to UEs.

The use of the persistent allocation in accordance with the exemplary embodiments of this invention provides a signaling scheme compatible with UTRAN LTE. Referring to FIG. 4, there is shown a block diagram of the Node B 12 protocol stack 12E. Layer 1 (L1) is the physical (PHY) layer 30, Layer 2 (L2) is the MAC layer 32 and Layer 3 (L3) is the Radio Network Layer (RNL) 34. Above Layer 3 are typically other layers, agents and entities, such as an IP layer 36, a QoS agent 38 and a Security agent 40, that are not particularly germane to an understanding of this invention. Various SAPs are shown in FIG. 4 for convenience, as are the various control (C) paths (CPDCP, CMAC, CPHY) between the L3 RRC and the underlying L2 and L1 entities. The PHY layer 30 includes a PHY controller/manager function 30A, the Radio Link Layer 32 includes a MAC controller/manager function 32A and a PDCP controller/manager function 32B, and the Radio Network Layer 34 is assumed to include a RRC controller/manager function 34A.

In accordance with the exemplary embodiments of this invention, the RRC entity 34A at L3 includes a persistent allocation manager function that controls the persistent allocation of resources to UEs 10. When a new data flow is set up, the RRC entity 34A decides whether persistent allocation should be used. If persistent allocation is used, then the BTS, which forms a part of the Node B 12, informs the UE 10 of the allocated resources via RRC signaling, as well as the PHY 30A (L1) via CPHY control messages. This implies that the use of the separate L1 signaling to the UE 10 (via an allocation table) for each allocation is avoided, which can provide a significant advantage due to the reduction in signaling overhead.

Since RRC (L3) signaling is utilized to inform the UE 10, the signaling message is received at the UE 10 at L3. Information in the received signaling message is subsequently passed on to the UE PHY.

As non-limiting examples, the RRC signaling message and/or the CPHY control message may comprise: a frequency resource(s) ID, a repetition factor (e.g., once every X TTIs), SFN mod X (e.g., to "synchronize" the allocation at the Node B 12 and the UE 10), and a hopping sequence (e.g., if the allocated frequency resources periodically change to provide frequency diversity). In other embodiments, the RRC signaling message and/or the CPHY control message may comprise a parameter indicating the "duration" of the allocation. In further embodiments, such a duration parameter may not be necessary because the Node B sends a specific message to release previously assigned persistent allocations.

The determination by the persistent allocation manager function whether or not a persistent allocation is used may be based on, as non-limiting examples, one or more of: the type of data flow being set up (e.g., VoIP, streaming), any specific QoS requirements of the UE 10 setting up the data flow, a total number of active UEs in a cell, the types of data flows (and resource allocations) currently in use by other UEs, and the current load in the network, in particular the DL load caused by L1 control signaling (e.g., allocation table). The use of the persistent allocation in accordance with the exemplary embodiments of this invention may be particularly advantageous during high load conditions.

To even further enhance the use and flexibility of this approach, the Node-B MAC layer packet scheduler (part of MAC entity 32A) may be enabled to propose new persistent allocations for UEs 10 and/or modifications of existing persistent allocations to higher or lower data rates. This is desirable since throughput monitoring and buffer information is available at the MAC layer 32. However, the persistent allocation manager function that is resident in the Radio Network Layer 34 makes the final determination as to whether to comply with the suggestions received from the L2 MAC entity 32A packet scheduler.

It should also be noted that the persistent allocation manager in L3 may also receive inputs from other layers, such as L1 (PHY), that affect the persistent resource allocation (e.g., channel quality indications). In general, it may be preferred to make the interface between the persistent allocation manager functionality and the PHY as generic as possible, such that the persistent allocation manager function may make use of both cell-based and link-based measurements provided by PHY. Other examples of information that may be provided by PHY to the persistent allocation manager function include, but need not be limited to, one or both of the load per resource pool (frequency and/or time) and an optimal MCS (Modulation and Coding Scheme) to be persistently assigned to a certain UE 10.

Note that this additional embodiment is optional, and is not required to implement the persistent allocation techniques in accordance with the exemplary embodiments of this invention.

Figure 5:
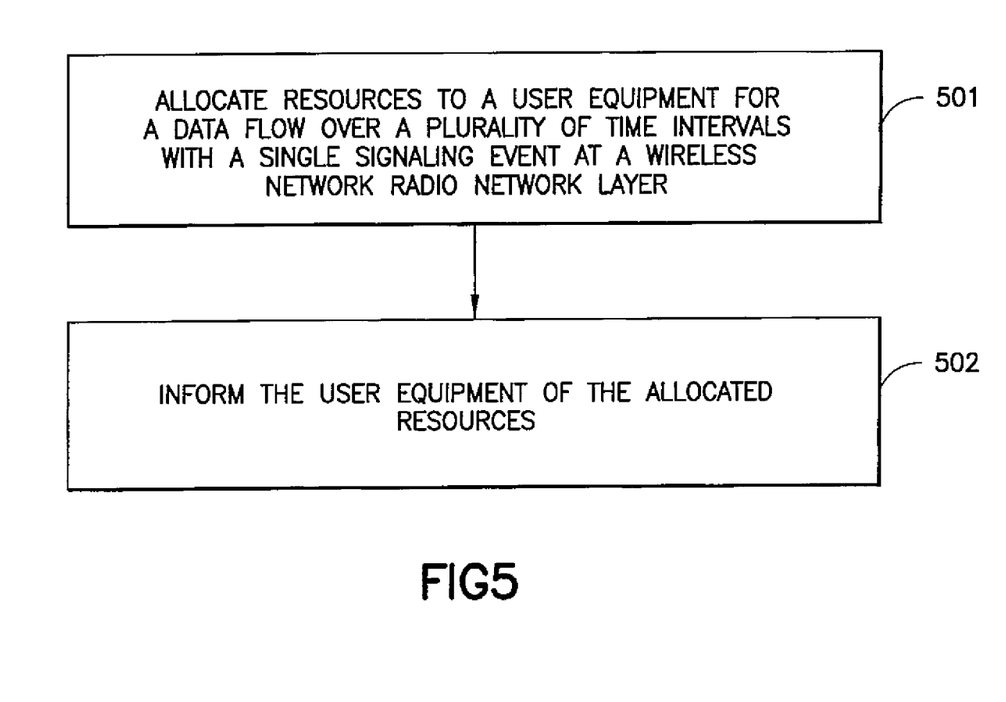
FIG. 5 depicts a flowchart illustrating one non-limiting example of a method for practicing the exemplary embodiments of this invention.

FIG. 5 depicts a flowchart illustrating one non-limiting example of a method for practicing the exemplary embodiments of this invention. The method includes: allocating resources to a user equipment for a data flow over a plurality of time intervals with a single signaling event at a wireless network radio network layer (501); and informing the user equipment of the allocated resources (502).

In other embodiments, the method further comprises: informing a physical layer control/manager function of the allocated resources. In further embodiments, informing the physical layer control/manager function of the allocated resources comprises using at least one CPHY control message. In other embodiments, wherein allocating is performed in response to a new data flow being set up. In further embodiments, informing the user equipment of the allocated resources comprises using radio resource control signaling. In other embodiments, allocating comprises considering only information available in the radio network layer.

In further embodiments, allocating comprises considering, at least in part, information obtained from at least one layer other than the radio network layer. In other embodiments, the information comprises at least one of: a cell-based measurement, a link-based measurement, a channel quality indication, a load per frequency resource pool, a load per time resource pool, and a modulation and coding scheme. In further embodiments, the information is obtained from a component of a physical layer. In other embodiments, the information is obtained from a component of a medium access control layer.

In other embodiments, the method further comprises: allocating at least one resource to accommodate fluctuations in radio resource requirements of the user equipment In further embodiments, allocating is performed in response to a Node B medium access control layer packet scheduler proposing one of a new allocation or a modification of an existing allocation. In other embodiments, the method further comprises: determining .whether a persistent allocation should be used or modified for a respective data flow, wherein allocating comprises in response to determining that a persistent allocation should be used or modified for a respective data flow, allocating the persistent allocation for the respective data flow. In further embodiments, determining whether persistent allocation should be used or modified for the respective data flow comprises considering at least one of: a type of the respective data flow, QoS requirements of a respective user equipment associated with the respective data flow, a total number of active user equipments in a cell, types of data flows currently in use by other user equipments, resource allocations of the other user equipments, and current load in an associated network. In other embodiments, the plurality of time intervals comprises a plurality of sub-frames.

Based on the foregoing it should be apparent that the exemplary embodiments of this invention provide a method, apparatus and computer program product(s) to provide a persistent allocation manager function in a Radio Network Layer of a wireless network component for selectively allocating resources to UEs for a plurality of sub-frame intervals with a single signaling event so as to reduce an amount of signaling to the UEs. The persistent allocation may be made in accordance only with information available in the Radio Network Layer, or in accordance with information obtained from another layer or layers, such as the Radio Link Layer. The persistent resource allocation may be made in conjunction with a temporary resource allocation to accommodate fluctuations in radio resource requirements by a particular UE.

As noted above, while the exemplary embodiments have been described above in the context of the UTRAN-LTE system, it should be appreciated that the exemplary embodiments of this invention are not limited for use with only this one particular type of wireless communication system, and that they may be used to advantage in other wireless communication systems.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method for operating a radio network base station comprising:
    allocating, by the base station, resources to a user equipment over a plurality of time intervals, where allocating is performed at a wireless network radio network layer of a protocol stack of the base station, allocating comprises considering, at least in part, information obtained from at least one protocol layer of the protocol stack of the base station other than the radio network layer and the plurality of time intervals comprises a plurality of sub-frames;
    informing the user equipment of a repetition interval, with a signaling event at the wireless network radio network layer, where the repetition interval is a semi-persistent scheduling interval that indicates a number of subframes between successive resources allocated to the user equipment; and
    informing the user equipment of the allocated resources using radio resource control protocol layer signaling.

2. The method of claim 1, further comprising: informing a physical layer control/manager function of the allocated resources.

3. The method of claim 2, wherein informing the physical layer control/manager function of the allocated resources comprises using at least one CPHY control message.

4. The method of claim 1, wherein allocating is performed in response to a new data flow being set up.

5. The method of claim 1, wherein the at least one protocol layer of the protocol stack other than the radio network layer is a physical layer, and the information comprises at least one of: a cell-based measurement, a link-based measurement, a channel quality indication, a load per frequency resource pool, a load per time resource pool, and a modulation and coding scheme.

6. The method of claim 1, wherein the information is obtained from a component of a physical layer of the protocol stack.

7. The method of claim 1, wherein the information is obtained from a component of a medium access control layer of the protocol stack.

8. The method of claim 1, further comprising: allocating at least one resource to accommodate fluctuations in radio resource requirements of the user equipment.

9. The method of claim 1, wherein the information obtained from at least one protocol layer of the protocol stack other than the radio network layer is a request from a medium access control layer, and allocating is performed in response to a Node B packet scheduler of the medium access control layer proposing one of a new allocation or a modification of an existing allocation.

10. The method of claim 1, further comprising:
    determining whether a persistent allocation should be used or modified for a respective data flow, wherein allocating comprises in response to determining that the persistent allocation should be used or modified for a respective data flow, allocating the persistent allocation for the respective data flow.

11. The method of claim 1, further comprising:
    allocating temporary resources to the user equipment, where the temporary resources are allocated for a time interval during the plurality of time intervals, and
    informing the user equipment of the temporary resources.

12. The method of claim 1, where allocating resources comprises allocating uplink resources for an uplink transmission by the user equipment.

13. The method of claim 1, where allocating resources comprises allocating downlink resources for a downlink transmission to the user equipment.

14. A computer-readable memory tangibly embodied with a computer program, execution of the program instructions resulting in a base station performing operations comprising:
    allocating resources to a user equipment over a plurality of time intervals, where allocating is performed at a wireless network radio network layer of a protocol stack of the base station, allocating comprises considering, at least in part, information obtained from at least one protocol layer of the protocol stack of the base station other than the radio network layer and the plurality of time intervals comprises a plurality of sub-frames;
    informing the user equipment of a repetition interval, with a signaling event at the wireless network radio network layer, where the repetition interval is a semi-persistent scheduling interval that indicates a number of subframes between successive resources allocated to the user equipment; and
    informing the user equipment of the allocated resources using radio resource control protocol layer signaling.

15. The computer-readable memory of claim 14, wherein execution of the program instructions results in operations further comprising: informing a physical layer control/manager function of the allocated resources.

16. The computer-readable memory of claim 4, wherein allocating is performed in response to a new data flow being set up.

17. The computer-readable memory of claim 14, wherein the at least one protocol layer of the protocol stack other than the radio network layer is a physical layer, and the information comprises at least one of: a cell-based measurement, a link-based measurement, a channel quality indication, a load per frequency resource pool, a load per time resource pool, and a modulation and coding scheme.

18. The computer-readable memory of claim 14, wherein the information is obtained from a component of a physical layer of the protocol stack.

19. The computer-readable memory of claim 14, wherein the information obtained from at least one protocol layer of the protocol stack other than the radio network layer is a request from a medium access control layer, and allocating is performed in response to a Node B packet scheduler of the medium access control layer proposing a new allocation or a modification of an existing allocation.

20. The computer-readable memory of claim 14, wherein execution of the program instructions results in operations further comprising:
   determining whether a persistent allocation should be used or modified for a respective data flow, wherein allocating comprises in response to determining that the persistent allocation should be used or modified for a respective data flow, allocating the persistent allocation for the respective data flow,
   wherein the at least one protocol layer of the protocol stack other than the radio network layer is a medium access control layer, and determining whether persistent allocation should be used or modified for the respective data flow comprises considering at least one of:
   a type of the respective data flow, QoS requirements of a respective user equipment associated with the respective data flow, a total number of active user equipments in a cell, types of data flows currently in use by other user equipments, resource allocations of the other user equipments, and current load in an associated network.

21. The computer-readable memory of claim 14, where allocating resources comprises allocating uplink resources for an uplink transmission by the user equipment.

22. The computer-readable memory of claim 14, where allocating resources comprises allocating downlink resources for a downlink transmission to the user equipment.

23. A base station comprising at least one processor; and at least one memory including computer program code, the at least one memory and the computer program code configured to, with the at least one processor, cause the base station to perform at least the following:
   allocate resources, using a radio network layer component of the base station, to a user equipment for a plurality of time intervals with a signaling event, where allocating is performed at a wireless network radio network layer of a protocol stack of the base station, allocating comprises considering, at least in part, information obtained from at least one protocol layer of the protocol stack of the base station other than the radio network layer and the plurality of time intervals comprises a plurality of subframes; and
   a transmitter coupled to the radio network layer component, wherein the transmitter is configured to transmit, to the user equipment a repetition interval, with a signaling event at the wireless network radio network layer,
   where the repetition interval is a semi-persistent scheduling interval that indicates a number of subframes between successive resources allocated to the user equipment; and
   to transmit information indicative of the allocated resources to the user equipment using radio resource control protocol layer signaling.

24. The apparatus of claim 23, wherein the radio network layer component is further configured to inform a physical layer control/manager function of the allocated resources.

25. The apparatus of claim 23, where the radio network layer component configured to allocate the resources is configured to allocate uplink resources for an uplink transmission by the user equipment.

* * * * *